United States Patent
Peflof et al.

(10) Patent No.: US 8,826,491 B2
(45) Date of Patent: Sep. 9, 2014

(54) VACUUM CLEANING APPLIANCE

(71) Applicant: Alfred Karcher GmbH & Co. KG, Winnenden (DE)

(72) Inventors: Gabor Peflof, Winnenden (DE); Roland Jeutter, Berglen (DE); Wolfgang Richter, Winnenden (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 0 days.

(21) Appl. No.: 13/745,473

(22) Filed: Jan. 18, 2013

(65) Prior Publication Data

US 2013/0125337 A1 May 23, 2013

Related U.S. Application Data

(63) Continuation of application No. PCT/EP2011/061048, filed on Jun. 30, 2011.

(30) Foreign Application Priority Data

Jul. 22, 2010 (DE) .......................... 10 2010 038 303

(51) Int. Cl.
*A47L 9/14* (2006.01)

(52) U.S. Cl.
USPC .............. 15/352; 15/327.6; 15/410; 248/129; 248/137

(58) Field of Classification Search
USPC .................. 15/327.6, 352, 410; 248/129, 137
IPC ......................................................... A47L 9/14
See application file for complete search history.

(56) References Cited

U.S. PATENT DOCUMENTS

| | | | | |
|---|---|---|---|---|
| 3,025,894 | A | * | 3/1962 | Hunt .............................. 141/369 |
| 3,930,630 | A | | 1/1976 | Wulff |
| 4,193,161 | A | | 3/1980 | Scott |

FOREIGN PATENT DOCUMENTS

| | | |
|---|---|---|
| CH | 688 734 A5 | 2/1998 |
| DE | 37 23 148 A1 | 1/1989 |
| DE | 295 02 556.5 U1 | 5/1995 |
| DE | 10 2004 013 063 B4 | 9/2005 |
| DE | 10 2008 028 645 A1 | 12/2009 |
| EP | 1 600 090 A2 | 11/2005 |

* cited by examiner

*Primary Examiner* — David Redding
(74) *Attorney, Agent, or Firm* — Womble Carlyle Sandridge & Rice, LLP

(57) ABSTRACT

The invention relates to a vacuum cleaning appliance having a moveable stand. A suction device mounted on the stand has a device upper part mounted on the stand and a dirt collection container situated beneath the device upper part. The stand has a lifting device and an actuating element pivotable about a horizontal axis for raising and lowering the dirt collection container, which in its raised position abuts against the device upper part in a flow-tight manner, and in its lowered position rests on a floor surface. The actuating element is configured as a push bar having a handle part which, in the raised position of the dirt collection container, may be gripped by the user in a standing posture in order to move the vacuum cleaning appliance, and is upwardly pivotable about the pivot axis by at most 135° in order to lower the dirt collection container.

23 Claims, 12 Drawing Sheets

VACUUM CLEANING APPLIANCE

CROSS-REFERENCE TO RELATED APPLICATIONS

This application is a continuation of international application number PCT/EP2011/061048, filed on Jun. 30, 2011, and claims the benefit of German application number 10 2010 038 303.1, filed on Jul. 22, 2010. The contents of both applications are incorporated herein by reference in their entirety and for all purposes.

BACKGROUND OF THE INVENTION

The invention relates to a vacuum cleaning appliance having a stand which is movable along a floor surface, and a suction device having a device upper part which is mounted on the stand, and a dirt collection container situated beneath the device upper part, the stand having at least one lifting device and an actuating element which is pivotable about a horizontal pivot axis for raising and lowering the dirt collection container, which in its raised position abuts against the device upper part in a flow-tight manner, and in its lowered position is situated at a distance from the device upper part and rests on the floor surface.

These types of vacuum cleaning appliances are often also referred to as industrial vacuum cleaners. They are used in particular for suction of dust on machines and equipment. The vacuum cleaning appliances have a stand which has casters and which may be moved along a floor surface. The suction device, which has a device upper part and a dirt collection container situated beneath the device upper part, is mounted on the stand. The device upper part includes a suction unit by means of which the dirt collection container may be acted on with negative pressure. This enables suctioned material, in particular dust, to be drawn into the dirt collection container. During normal operation of the vacuum cleaning appliance, the dirt collection container abuts against the device upper part in a flow-tight manner. For emptying, the dirt collection container may be transferred from its raised position, in which it abuts against the device upper part in a flow-tight manner, to a lowered position in which it is situated at a distance from the device upper part and rests on the floor surface. The dirt collection container may then be removed from the stand and emptied. For this, it may be provided that casters are disposed on the dirt collection container, by means of which the lowered dirt collection container may be moved along the floor surface.

For raising and lowering the dirt collection container, at least one lifting device is used which is situated on the stand of the vacuum cleaning appliance. An actuating element which is pivotable about a horizontal pivot axis is associated with the lifting device. The dirt collection container may be raised and lowered by means of the lifting device, by pivoting the actuating element.

It is an object of the present invention to improve a vacuum cleaning appliance of the type mentioned at the outset in such a way that the vacuum cleaning appliance is easier to handle.

SUMMARY OF THE INVENTION

For a vacuum cleaning appliance of the generic kind, this object is achieved according to the invention in that the actuating element is configured as a push bar which, in the raised position of the dirt collection container, may be gripped by the user in a standing posture in order to move the vacuum cleaning appliance, and is upwardly pivotable about the pivot axis by at most 135° in order to lower the dirt collection container.

The vacuum cleaning appliance according to the invention is characterized by simple handling, since the actuating element used for raising and lowering the dirt collection container is configured in the form of a push bar by means of which the vacuum cleaning appliance may be moved along the floor surface to a desired site of operation. The user may grip the push bar in an ergonomically favorable manner while standing, and may exert a pushing or pulling force on the vacuum cleaning appliance, in particular on the stand, via the push bar.

To empty the dirt collection container, the user may pivot the push bar upwardly about the pivot axis; while pivoting the push bar, the user may maintain his position at the side of the vacuum cleaning appliance for gripping the push bar, since the push bar must be pivoted upwardly by at most 135° in order to lower the dirt collection container onto the floor surface. The user may then dispose of the contents of the dirt collection container.

It is advantageous if, in the raised position of the dirt collection container, the push bar is inclined by at most 30° with respect to the horizontal; in particular a maximum angle of inclination of 20°, at most 10°, for example, with respect to the horizontal, has proven to be very advantageous.

The push bar has a handle part which may be gripped by the user. In the raised position of the dirt collection container, the handle part is preferably positionable at a distance of 80 cm to 100 cm, in particular 90 cm, from the floor surface. The user may thus comfortably grip the handle part in a standing posture.

In the lowered position of the dirt collection container, the push bar is advantageously inclined by at most 30° with respect to the vertical. In particular, an angle of inclination with respect to the vertical of at most 20°, at most 10°, for example, is advantageous, since this additionally simplifies the handling of the vacuum cleaning appliance while lowering the dirt collection container.

It may be provided that the dirt collection container is raisable and lowerable by pivoting the push bar by at most 90°. This type of pivot motion may be carried out by the user in a particularly simple manner without the user having to change his position relative to the vacuum cleaning appliance.

In particular, it may be provided that in the raised position of the dirt collection container, the push bar is aligned substantially horizontally, and in the lowered position of the dirt collection container is aligned substantially vertically.

It is advantageous if, in the lowered position of the dirt collection container, a handle part of the push bar is positioned above the housing upper part.

In a preferred embodiment of the vacuum cleaning appliance according to the invention, the stand has two support columns between which the suction device is situated, and on which in each case a load-bearing part that is coupled to the push bar is mounted in a height-adjustable manner. The dirt collection container may be raised and lowered by means of the two load-bearing parts. It may be provided, for example, that the load-bearing parts each engage beneath a lateral support arm of the dirt collection container. Each of the load-bearing parts is mounted in a height-adjustable manner on a support column of the stand and is coupled to the push bar, so that the load-bearing parts may be moved in their position relative to the floor surface by a pivot motion of the push bar.

It is advantageous if the load-bearing parts in each case are displaceably mounted in a guide of a support column. The guide may be configured, for example, in the form of a groove or also in the form of an oblong hole.

It is particularly advantageous if the load-bearing parts are mounted on a support column so that they are displaceable in the vertical direction.

The coupling of the load-bearing parts to the push bar is advantageously achieved via a toggle lever. The use of a toggle lever has the advantage that by means of a simple design, it allows the push bar to be fixed in the raised and lowered positions of the dirt collection container. For this purpose, the toggle lever may have two lever arms which are articulatedly connected to one another, which, during raising of the dirt collection container, starting from a first inclined position in which they are oriented at an angle relative to one another, via an extended position in which they are in full alignment with one another, go into a second inclined position in which they are once again oriented at an angle relative to one another. The extended position of the two lever arms forms a dead center of the toggle lever. During raising and lowering of the dirt collection container, this dead center is in each case passed through, so that the push bar, which is connected to the load-bearing parts via the toggle lever, in each case automatically maintains its position.

The use of a toggle lever has the further advantage that the torque exerted on the push bar via the toggle lever, when the dirt collection container is raised and lowered, may be varied. For this purpose, the pivot axis of the push bar may advantageously be situated in the articulated joint via which the two lever arms of the toggle lever are connected to one another. This provides the possibility of changing the position of the pivot axis when the push bar pivots. This in turn has the advantage that the torque exerted by the dirt collection container on the push bar when the push bar is pivoted may be changed. The dirt collection container, above all in the filled state, has considerable weight, which results in a torque that acts on the push bar when the dirt collection container is lowered. Due to the possibility of changing the position of the pivot axis when the push bar is pivoted, when the dirt collection container is lowered, the pivot axis may be initially oriented in such a way that only a very low torque acts on the pivot axis. This may be achieved by the pivot axis being situated only a small distance from the vertical extending through the center of gravity of the dirt collection container. As a result, the user is able to hold the push bar with little effort and then pivot the push bar upwardly.

It may be provided that each of the toggle levers has a first lever arm which is pivotably mounted on the support column and which, by means of an articulated joint, is connected to a second lever arm that is articulatedly coupled to a load-bearing part via a connecting rod.

It is advantageous if the second lever arm is fixedly connected to the push bar.

In particular, it may be provided that the push bar is C- or U-shaped and has two end portions that are connected to one another via a connecting portion which forms a handle part, a second lever arm of a toggle lever in each case adjoining the end portions.

It is advantageous if each of the second lever arms is oriented obliquely or perpendicularly with respect to an end portion of the push bar. In particular, an orientation that is substantially perpendicular to the end portions of the push bar is advantageous.

In one embodiment having a particularly simple design, which is characterized by high mechanical load capacity, the second lever arms of the toggle levers are joined to the push bar in one piece.

The push bar may be configured, for example, in the form of a C- or U-shaped metal or plastics tube whose end portions in each case merge into a second lever arm of a toggle lever via a curved portion.

It is advantageous if the push bar may be acted on by a retention force in the lowered position of the dirt collection container. In the lowered position of the dirt collection container, the push bar in the vacuum cleaning appliance according to the invention is preferably oriented substantially vertically upwardly, or assumes a position which preferably is not inclined more than 30° with respect to the vertical. The push bar may advantageously be acted on by a retention force so that it is not inadvertently movable. For this purpose, for example at least one spring element may be used which in the lowered position of the dirt collection container acts on the push bar with a spring force. The push bar may then be pivoted downwardly about the pivot axis, against the action of the spring force, in order to raise the dirt collection container. The spring element may be configured as a tension spring, for example.

It is particularly advantageous if the push bar is lockable in the raised position of the dirt collection container. Inadvertent movement of the push bar, and thus also of the dirt collection container, may thus be reliably prevented.

It may be provided, for example, that the vacuum cleaning appliance has at least one locking element which is movable back and forth between a locked position, in which the push bar is locked, and a released position in which the push bar is pivotable. The locking element may be moved back and forth by the user, or it may also interact with an energy store which moves the locking element. A spring element, for example, may be provided as the energy store.

In a preferred embodiment of the invention, when the dirt collection container is raised, the at least one locking element is automatically movable into its locked position by pivoting the push bar. This further simplifies the handling of the vacuum cleaning appliance. In order to lower the dirt collection container, the user may move the at least one locking element from its locked position into its released position, so that the push bar may subsequently be pivoted upwardly about its pivot axis. The dirt collection container may then be emptied as described above, and may subsequently be raised once again by pivoting the push bar. The at least one locking element automatically goes into its locked position when the dirt collection container is raised. Thus, after the dirt collection container is raised, it is not necessary for the user to manually lock the push bar by moving the at least one locking element into its locked position; instead, the at least one locking element automatically goes into its locked position when the dirt collection container is raised.

It is particularly advantageous if the at least one locking element interacts with a spring element which selectively holds the locking element in the locked position or in the released position, depending on the orientation of the locking element relative to the spring element. The spring element thus selectively holds the at least one locking element in its locked position or in its released position, depending on which orientation the locking element has at that moment. This provides the user with the option, for example, of manually pivoting the locking element from its locked position into its released position. Under the action of the spring element, the locking element then remains in its released position until it is once again transferred to its locked position. The spring element thus ensures that the locking element does not inadvertently occupy an intermediate position.

In one advantageous embodiment, particularly simple handling of the vacuum cleaning appliance according to the invention is provided in that the at least one locking element is manually movable into its released position in order to lower the dirt collection container, and automatically goes into its locked position when the dirt collection container is raised.

In a preferred embodiment, the at least one locking element is situated on the push bar. The locking element is thus easily accessible to the user.

To prevent inadvertent movement of the push bar, it is advantageous if two movable locking elements are situated on the push bar, each interacting with a locking member which is fixedly secured to the stand. In such an embodiment, the user must intentionally activate two locking elements to allow the push bar to pivot upwardly about the pivot axis. Inadvertent movement of the push bar is thus practically ruled out.

It may be provided that the at least one locking element is configured as a detent hook which is pivotably mounted on the push bar, and which in the locked position engages behind a detent pin situated on the stand.

When the push bar is pivoted, the detent hook advantageously slides along the detent pin into the position corresponding to the raised position of the dirt collection container, and automatically goes into its locked position. For this purpose, the detent hook may have a sliding surface which comes into contact with the detent pin, so that the detent hook is moved into its locked position by the detent pin upon further pivoting of the push bar.

The following description of a preferred embodiment of the invention is used to explain the invention in greater detail in conjunction with the drawings.

DETAILED DESCRIPTION OF THE INVENTION

Figure 1:
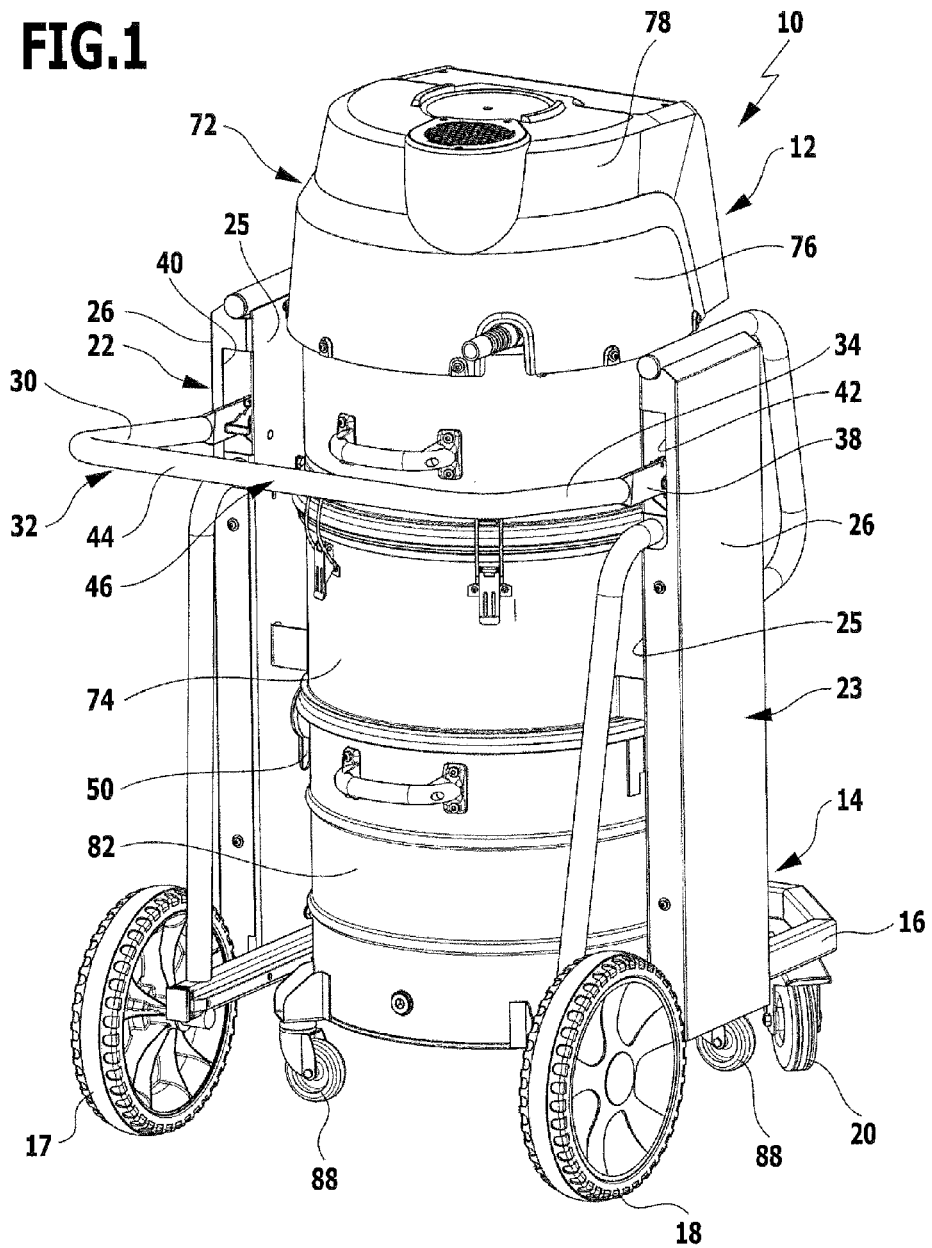
FIG. 1 shows a perspective illustration of a vacuum cleaning appliance according to the invention, having a stand and a suction device, a dirt collection container of the suction device being in a raised position.

FIGS. 1 to 6 schematically illustrate a vacuum cleaning appliance 10 having a suction device 12 which is mounted on a mobile stand 14. The stand 14 includes a frame 16 which is substantially U-shaped in the top view, and on which two rear wheels 17, 18 and two swivel casters 19, 20 are rotatably mounted so that the stand 14 may be moved along a floor surface.

A first support column 22 and a second support column 23 project vertically upwardly from the frame 16. The two support columns 22, 23 are identically configured. The support columns 22, 23 each have a support plate 25 on their mutually facing inner sides, and the two support columns 22, 23 each include a cover plate 26 on their outer sides which face away from one another. The suction device 12 is mounted between the support plates 25 of the two support columns 22, 23. The cover plate 26 has been omitted in FIGS. 3 and 5 for the sake of improved clarity, and a support plate 25 is not illustrated in FIGS. 8 to 11, for the sake of improved clarity.

The cover plates 26 are each situated at a distance from a support plate 25. Each of the two support columns 22, 23 has a chamber between the support plate 25 and the cover plate 26, in which a lifting mechanism 28 is situated. The two lifting mechanisms are identically configured. The lifting mechanism 28 situated in the first support column 22 is articulatedly connected to a first leg 30 of a U-shaped push bar 32, and the lifting mechanism 28 of the second support column 23 is articulatedly connected to a second leg 34 of the push bar 32. For this purpose, the end sections 36, 38 of the first leg 30 and second leg 34, respectively, extend into the respective chamber in the support column via lateral openings 40, 42 in the first support column 22 and the second support column 23, respectively. The ends of the two legs 30 and 34 facing away from the support columns 22 and 23, respectively, are joined together in one piece via a cross-piece 44 of the push bar 32. The cross-piece 44 forms a handle part 46 of the push bar 32, and at this handle part 46 the user may comfortably grip the push bar 32 in a standing posture, as explained in greater detail below.

The lifting mechanism 28 situated in each support column 22, 23 includes a roller-like load-bearing part 48 which passes through a guide element in the form of an oblong hole 50 in the support plate 25 and protrudes from the support plate 25 in the direction of the suction device 12. A connecting rod 52 is pivoted to the load-bearing part 48 inside the respective support column 22, 23. The connecting rod 52 extends upwardly within the respective support column 22, 23, and is articulatedly connected to a toggle lever 54. The toggle lever 54 includes a first lever arm 56 and a second lever arm 58. At a first end, the first lever arm 56 is mounted on the support plate 25 so as to be pivotable about a horizontal pivot axis 60, and the second end of the first lever arm 56 is articulatedly connected via a toggle lever joint 62 to the second lever arm 58, which in turn is articulatedly connected to the connecting rod 52 via a further articulated joint 64.

Figure 5:
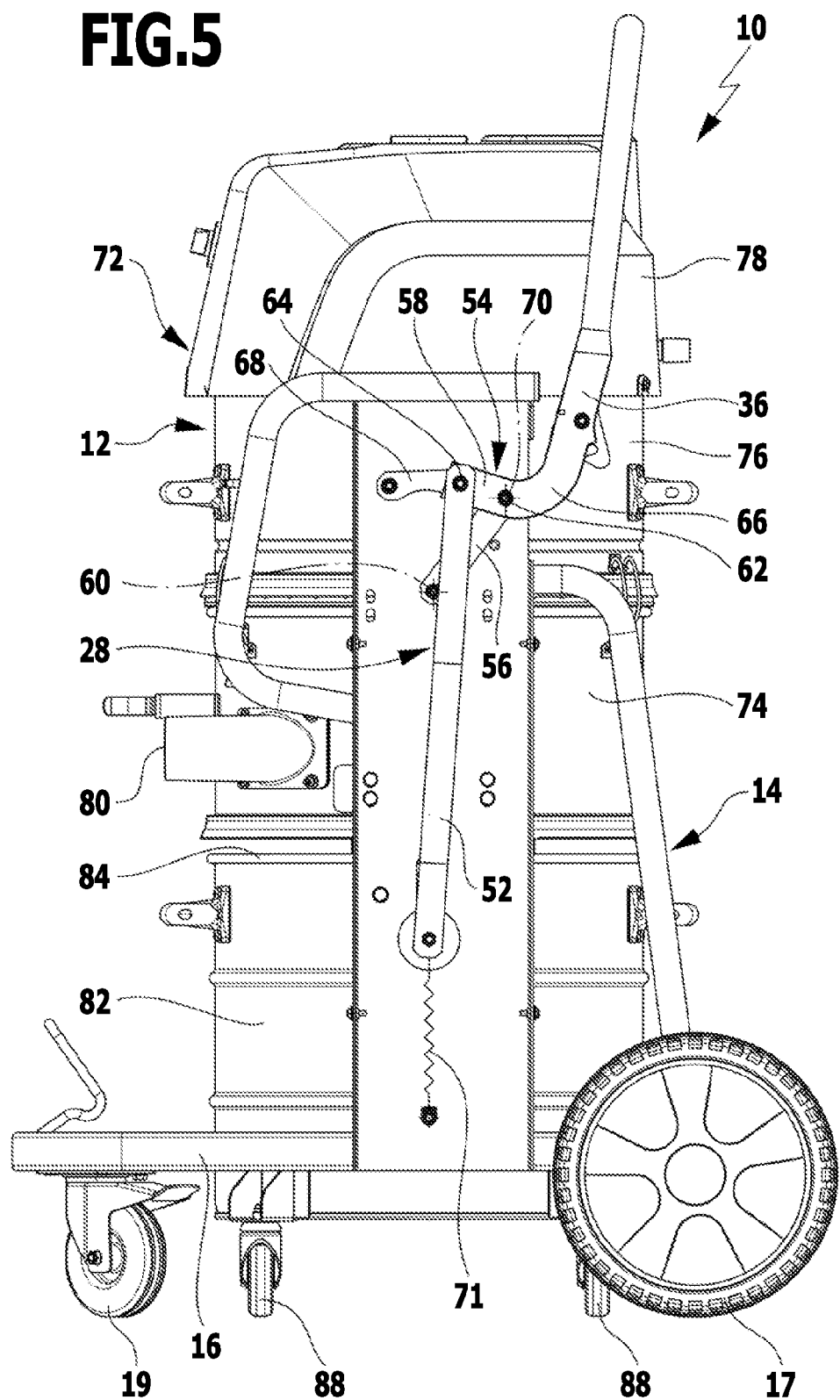
FIG. 5 shows a side view of the vacuum cleaning appliance from FIG. 1, the dirt collection container being in a lowered position, and a cover plate of a support column of the stand having been removed.
Figure 6:
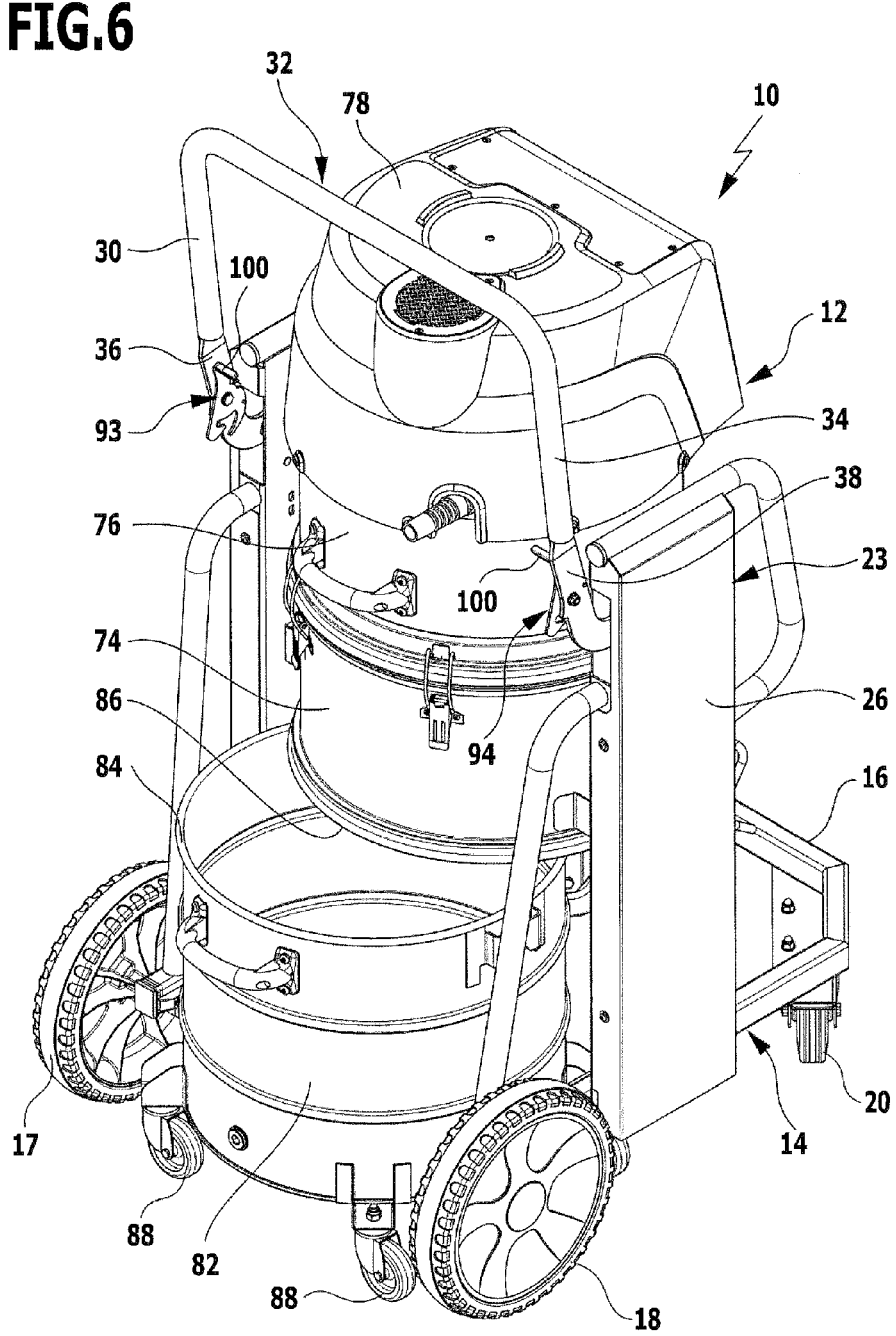
FIG. 6 shows a perspective illustration of the vacuum cleaning appliance from FIG. 1, the dirt collection container being in its lowered position, and being offset with respect to a housing upper part of the suction device.
Figure 7:
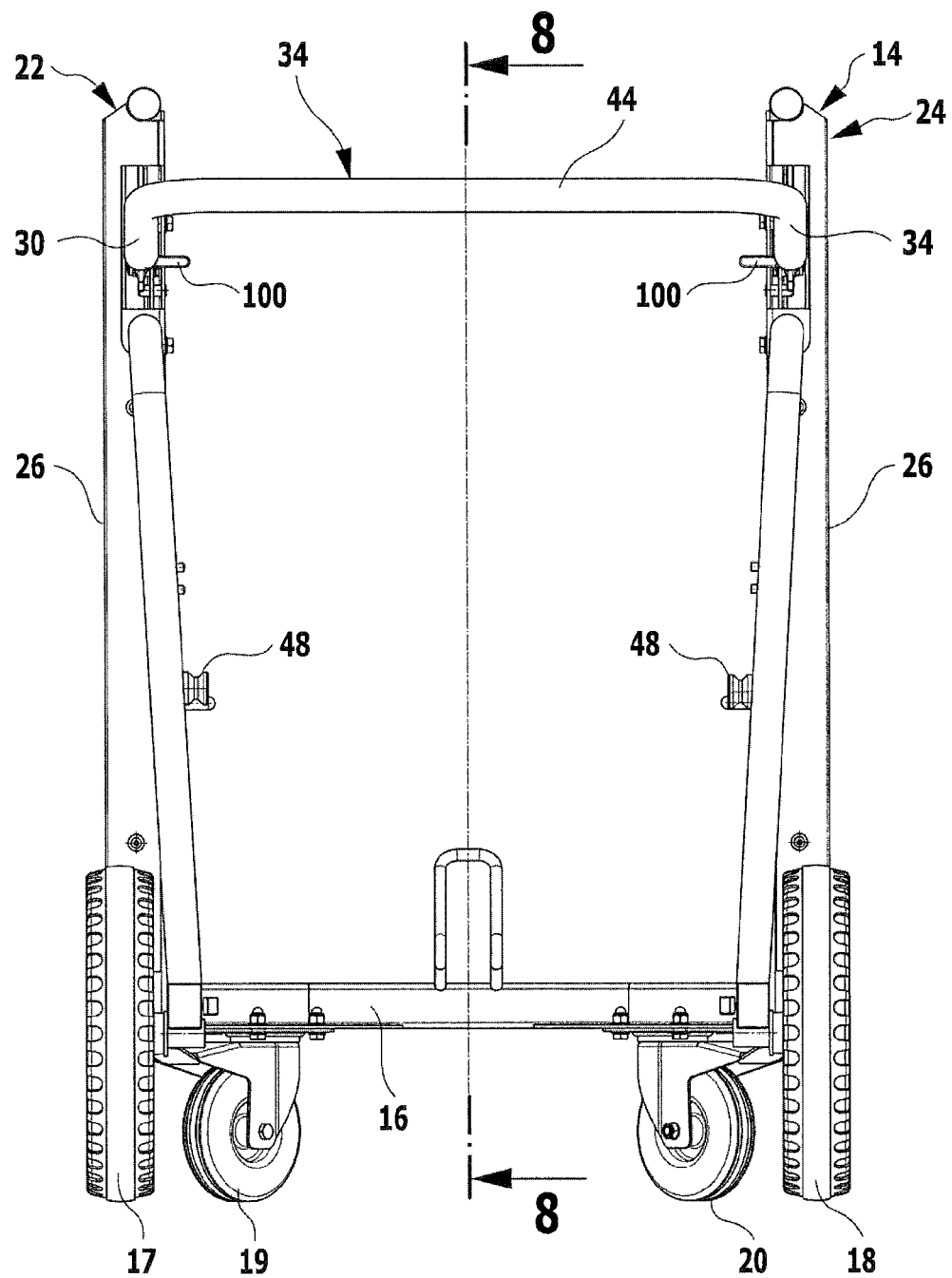
FIG. 7 shows a front view of the stand of the vacuum cleaning appliance from FIG. 1, a push bar of the stand being in a substantially horizontal position.
Figure 8:
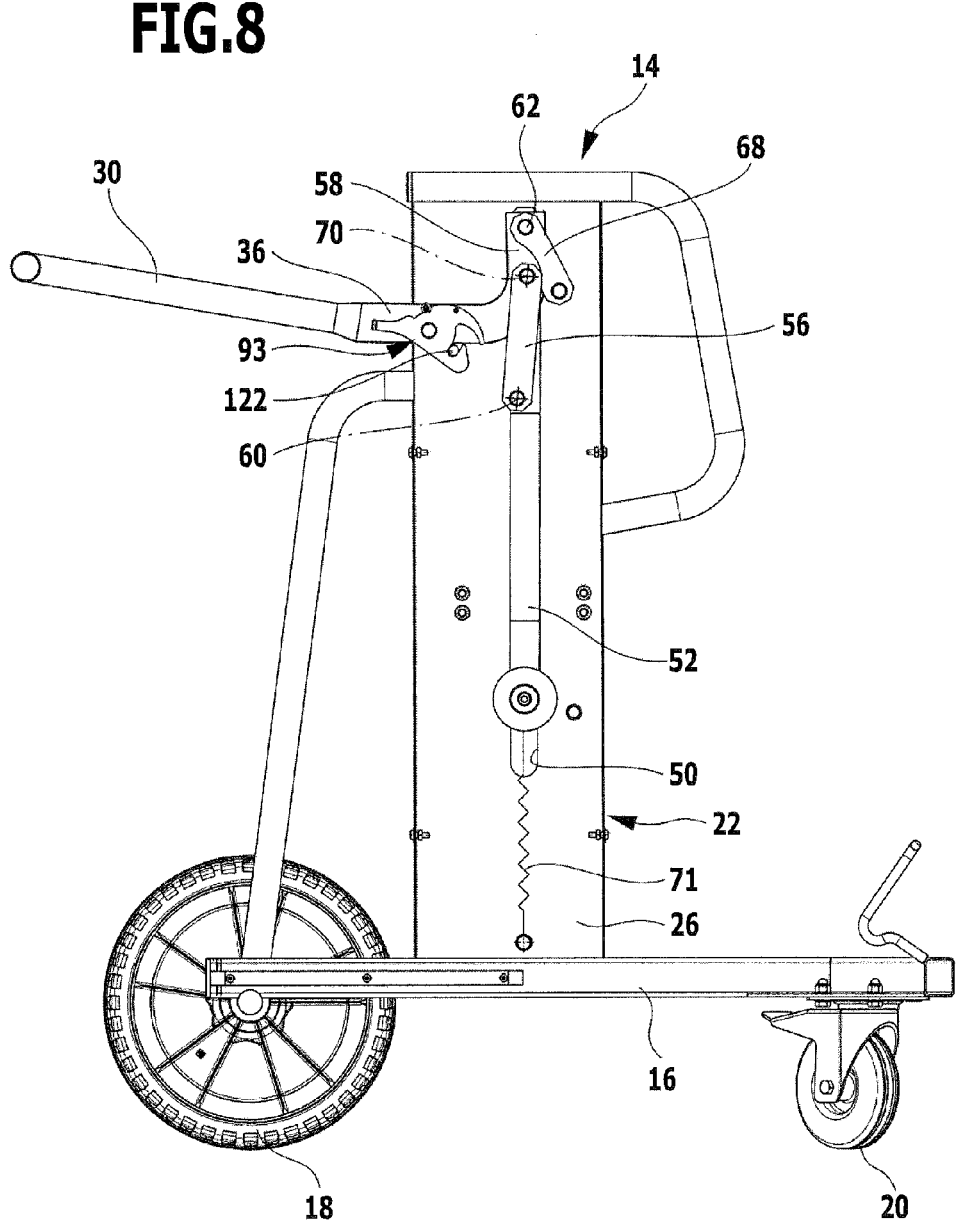
FIG. 8 shows a sectional view along the line 8-8 in FIG. 7, the push bar being in its substantially horizontal position, and a detent hook mounted on the push bar being in its detent position.
Figure 9:
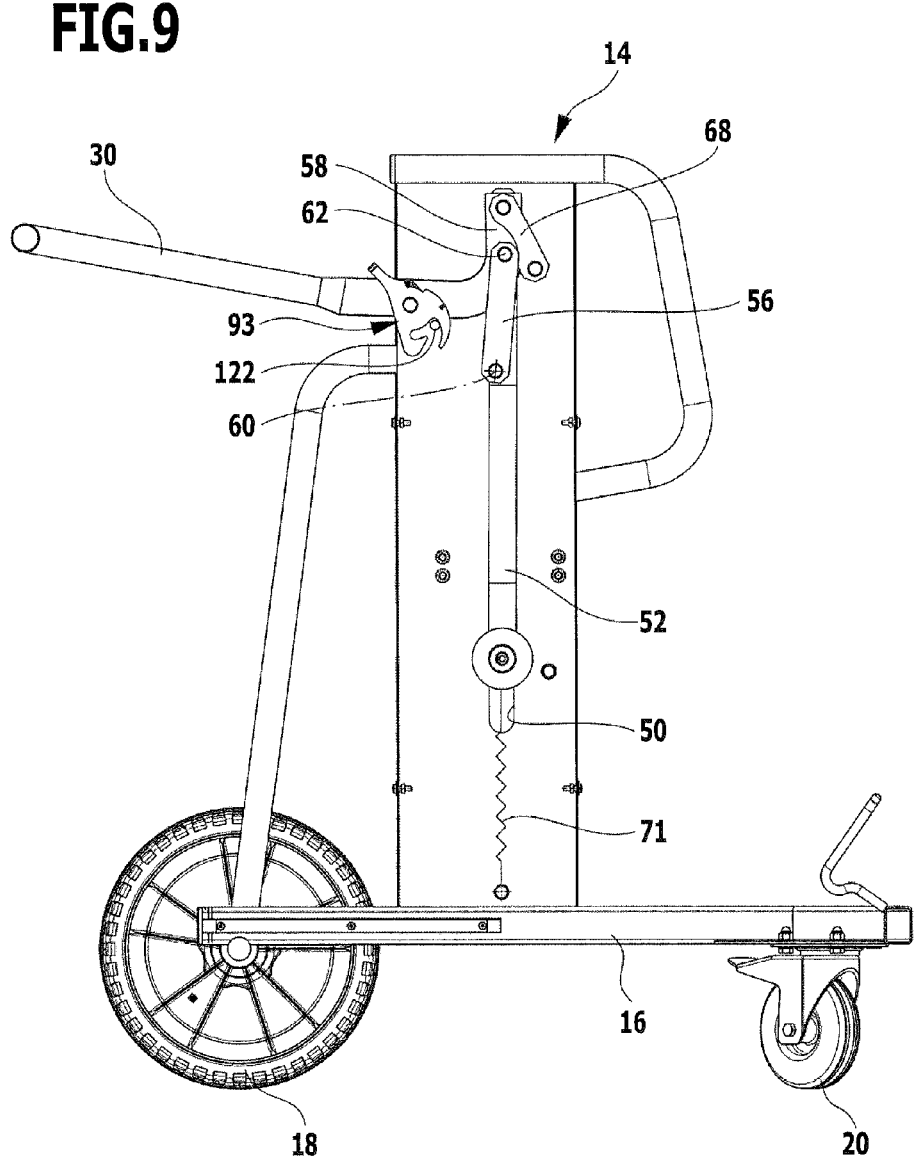
FIG. 9 shows a sectional view corresponding to FIG. 8, the detent hook being in its released position.
Figure 10:
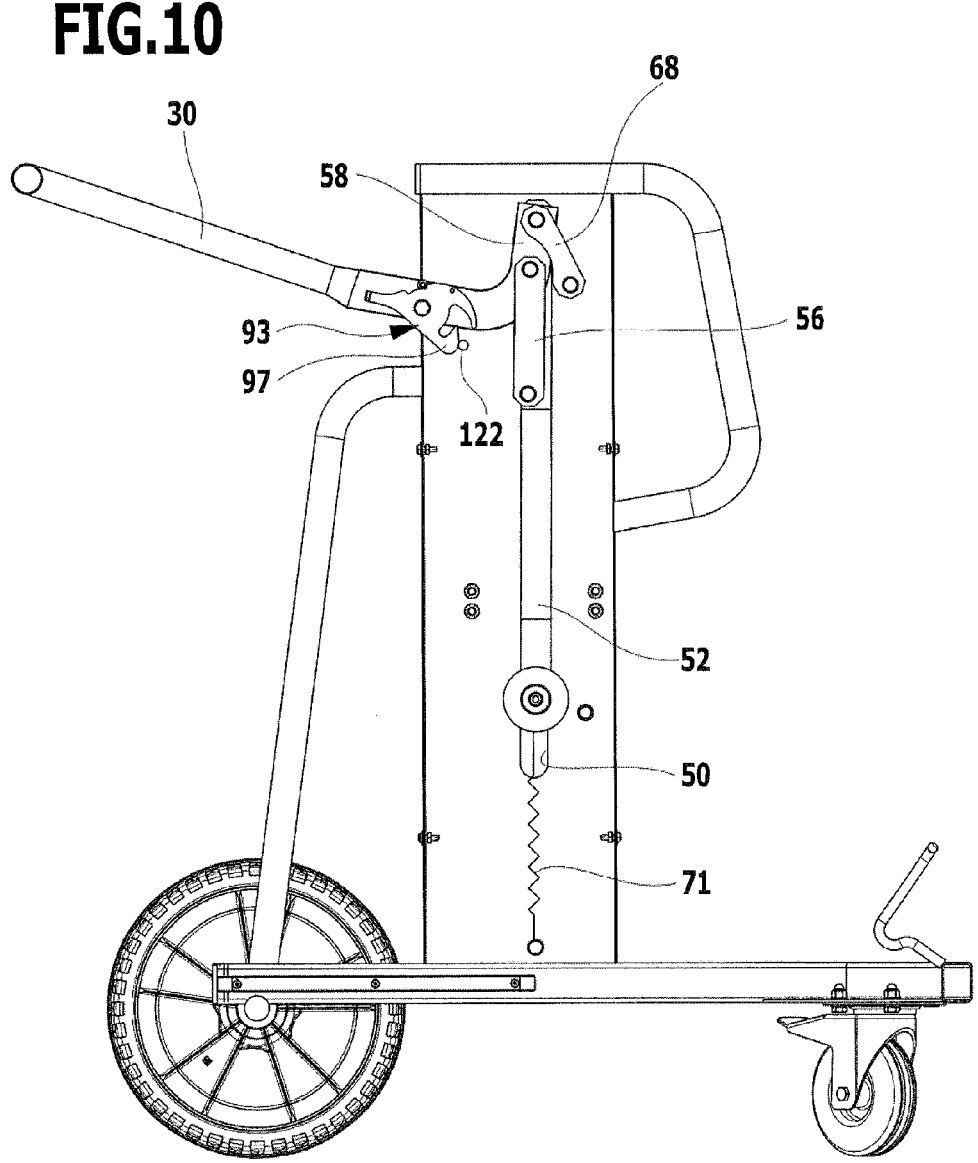
FIG. 10 shows a sectional view corresponding to FIG. 8 in the transition of the push bar from its substantially horizontal position into a substantially vertical position.
Figure 11:
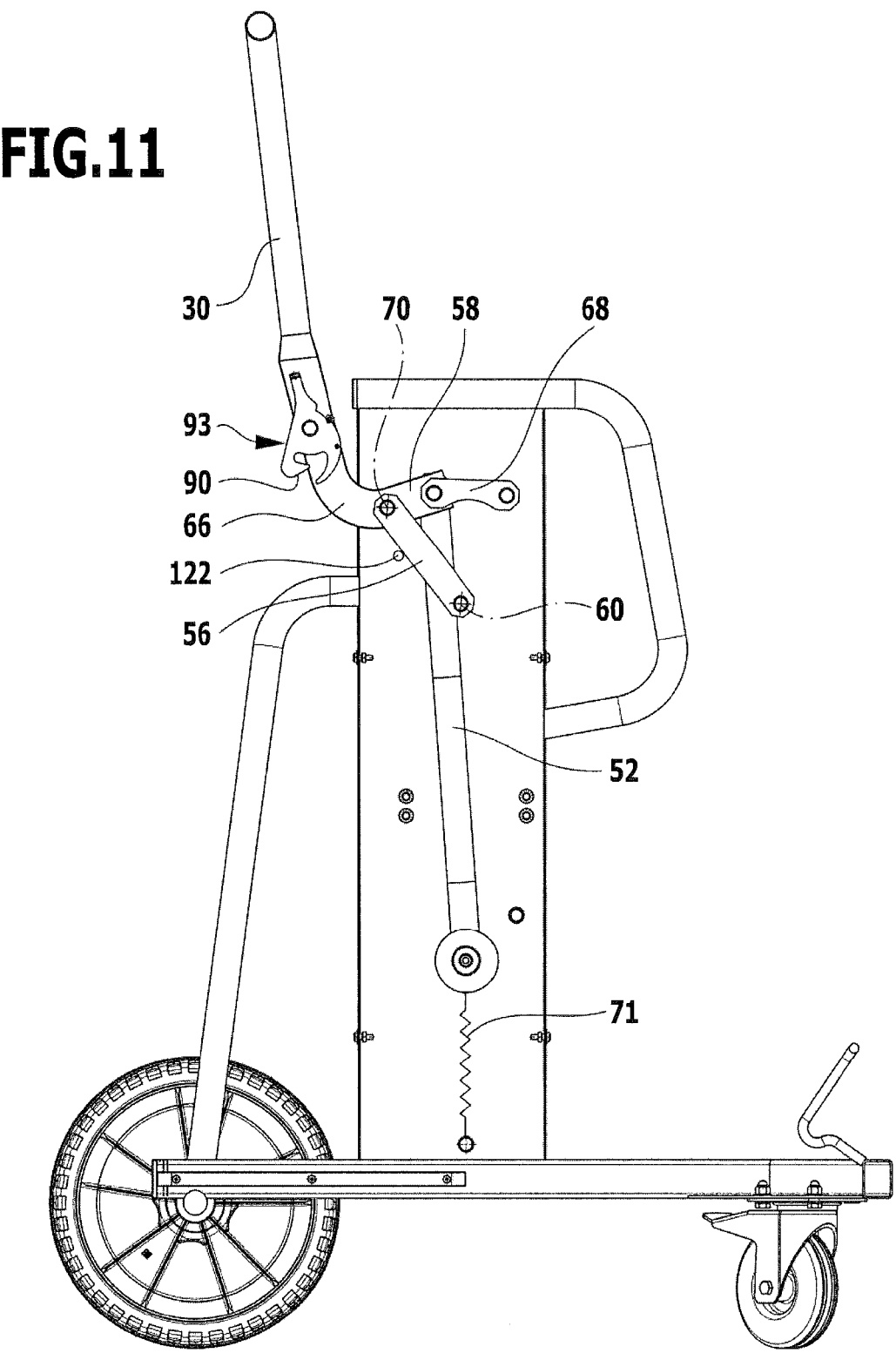
FIG. 11 shows a sectional view corresponding to FIG. 8, the push bar being in its substantially vertical position.

As is apparent in particular from FIG. 5, the end portions 36 and 38 of the push bar 32 are each joined as one piece to a second lever arm 58 of a toggle lever 54. The second lever arms 58 are oriented approximately at right angles to the respective end portions 36 and 38, and are connected to an end portion 36 and 38, respectively, of the push bar 32 via a curved portion 66.

In addition to the first lever arm 56, a supplementary lever 68 is pivoted on the support plates 25 of the two support columns 22, 23, and via the further articulated joint 64, is pivotally connected to the connecting rod 52 and to the second lever arm 58. The supplementary lever 68 imparts additional mechanical stability to the lifting mechanism 28.

The two toggle lever joints 62 of the lifting mechanisms 28 of the two support columns 22, 23 define a horizontally aligned pivot axis 70 about which the push bar 32 may be pivoted back and forth between its operating position illustrated in FIGS. 1, 2, 3 and 7, 8, 9, in which it is substantially horizontally aligned, and its servicing position illustrated in FIGS. 4, 5, 6, and 11, in which it is substantially vertically aligned. As a result of the pivot motion of the push bar 32, the load-bearing parts 48 which protrude from the respective support plate 25 on the mutually facing sides of the support columns 22, 23 are moved vertically upwardly or downwardly into the respective oblong holes 50. The definition of the pivot axis 70 by means of the toggle lever joints 62 allows the position of the pivot axis 70 to be changed. The motion of the pivot axis 70 is determined by the second lever arms 58 and the supplementary levers 68, and is delimited by the end positions thereof.

To reliably hold the push bar 32 in its servicing position, which is directed substantially vertically upwards, the lifting mechanism 28 has a tension spring 71 in each support column 22, 23 which on the one hand is fixed to the support plate 25 and on the other hand is fixed to the free end of the connecting rod 52. The tension spring 71 exerts a spring force on the push bar 32 via the connecting rod 52 and the respective toggle lever 54, which force holds the push bar in its servicing position. Starting from the servicing position, the push bar may be pivoted into its operating position, against the spring-elastic restoring force of the tension spring 71.

The suction device 12 includes a device upper part 72 having an inlet chamber 74, a filter chamber 76, and a suction head 78, which are stacked one on top of the other. The inlet chamber 74 is screwed to the support plates 25 of the support columns 22, 23 via lateral mountings 77, 79, respectively. This is apparent in particular from FIGS. 2 and 4. A suction inlet 80 opens into the inlet chamber 74, and in a conventional manner the suction head 78 accommodates a suction unit, which is known per se and therefore not illustrated in the drawing for the sake of improved clarity, by means of which the inlet chamber 74 may be acted on by negative pressure. The suction head 78 is in flow connection with the inlet chamber 74 via the filter chamber 76. A filter device, which is known per se and therefore likewise not illustrated in the drawing for the sake of improved clarity, is situated in the filter chamber 76.

The suction device 12 has a dirt collection container 82 beneath the device upper part 72 which is formed in the manner of a bucket, and which by means of the load-bearing parts 48 of the lifting mechanisms 28 may be pressed with its free edge 84 against the lower edge 86 of the substantially hollow cylindrical inlet chamber 74 in a flow-tight manner, with a sealing ring, not illustrated in the drawing, situated in between. This is explained in greater detail below.

The dirt collection container 82 has support wheels 88 on its underside, by means of which the dirt collection container 82, provided that it is released from the device upper part 72, may be moved along the floor surface. This is apparent in particular from FIG. 6.

The dirt collection container 82 has lateral support arms 90 and 91, each facing the oppositely situated load-bearing parts 48, which arms in each case may be engaged from beneath by a load-bearing part 48. This is apparent in particular from FIGS. 2 and 4. For this purpose, the dirt collection container 82 must be positioned beneath the inlet chamber 74.

Figure 2:
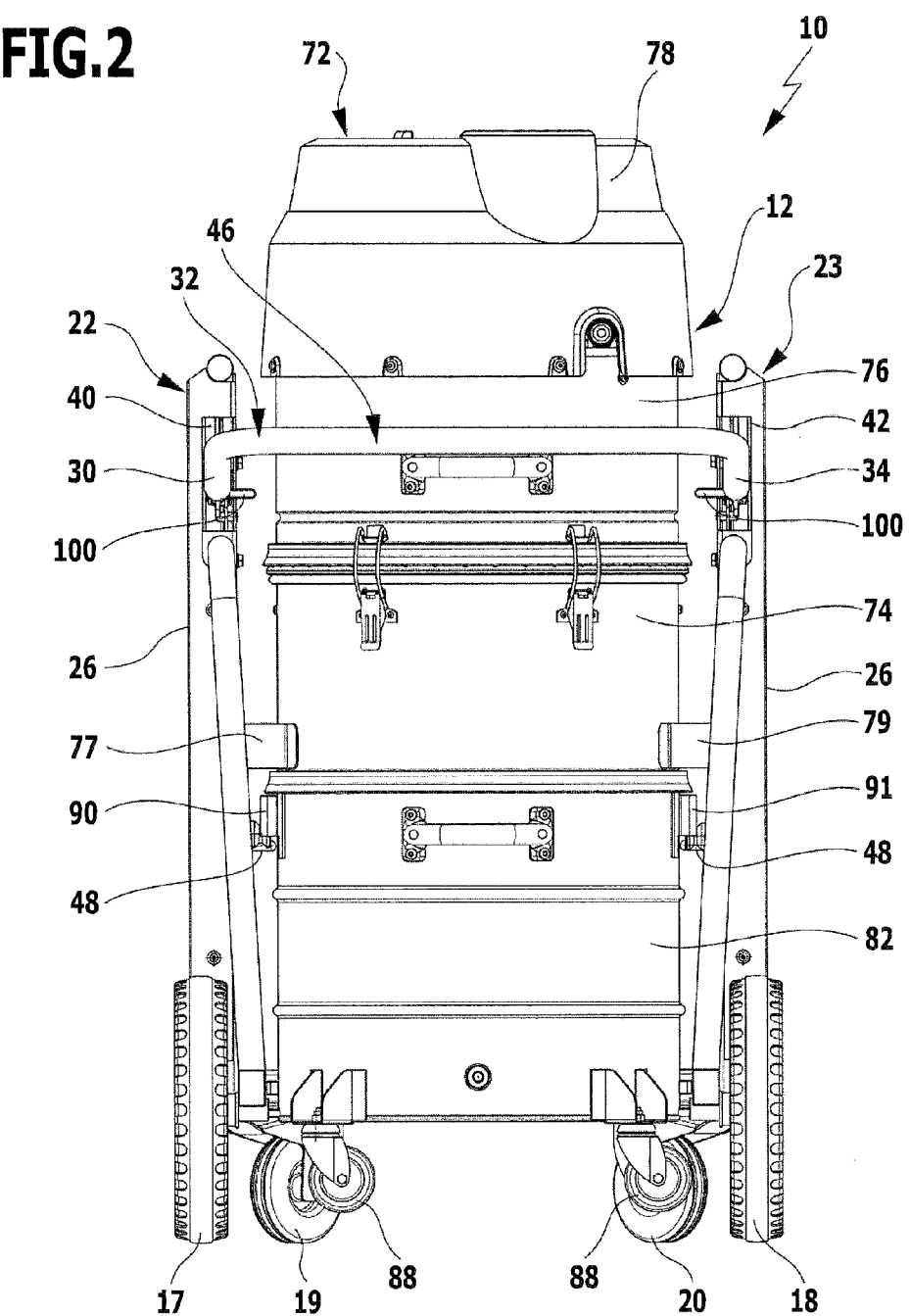
FIG. 2 shows a front view of the vacuum cleaning appliance from FIG. 1, the dirt collection container being in its raised position.
Figure 3:
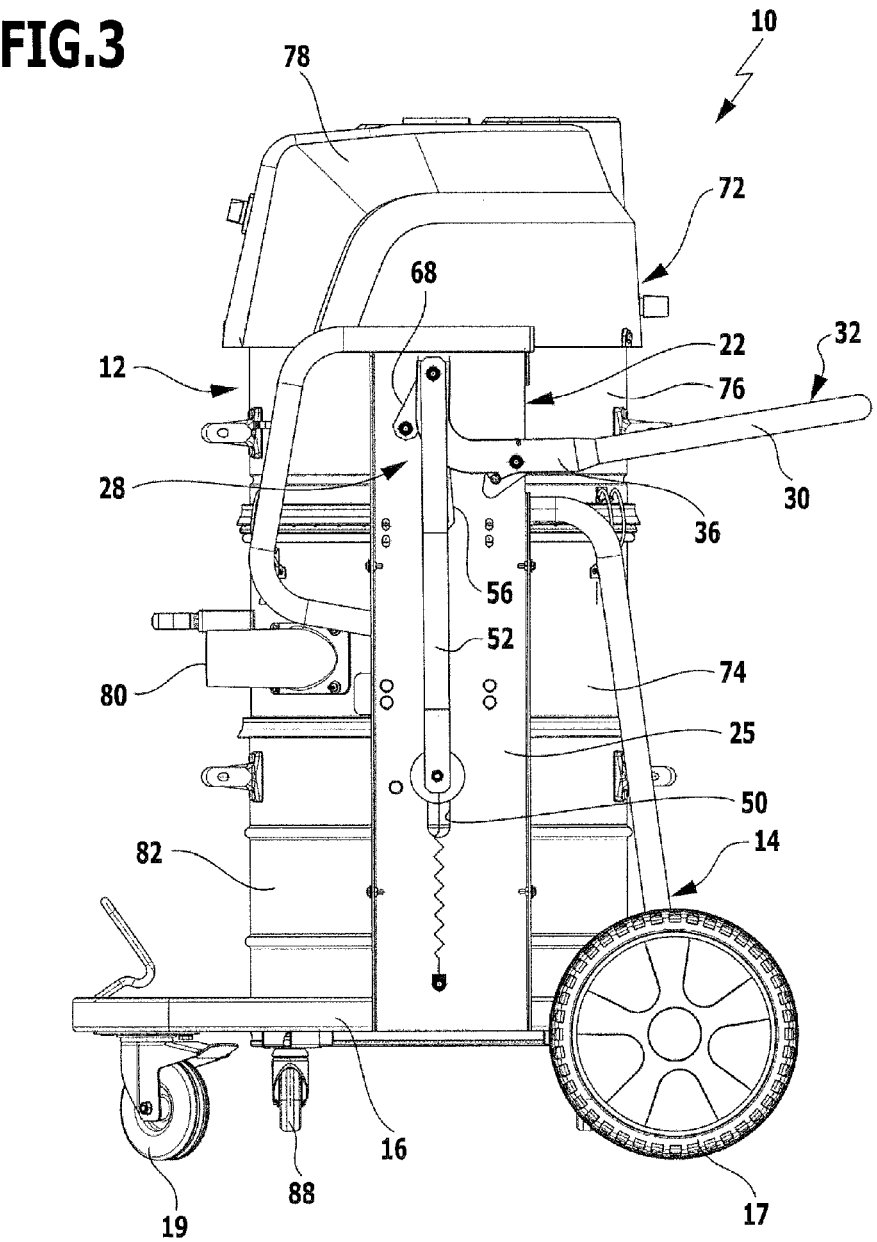
FIG. 3 shows a side view of the vacuum cleaning appliance from FIG. 1, the dirt collection container being in its raised position, and a cover plate of a support column of the stand having been removed.
Figure 4:
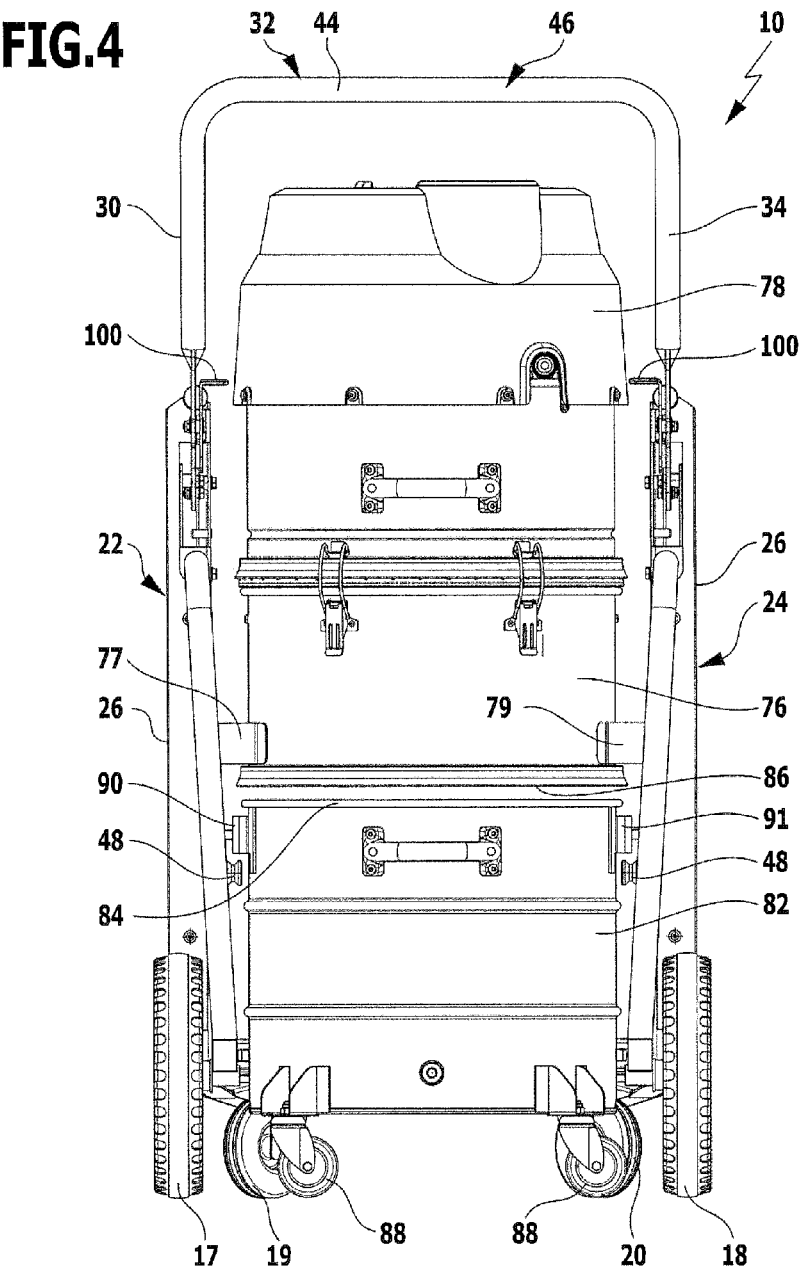
FIG. 4 shows a front view of the vacuum cleaning appliance from FIG. 1, the dirt collection container being in a lowered position.

The dirt collection container 82 may be raised and lowered by means of the lifting mechanism 28, by pivoting the push bar 32. In the raised position of the dirt collection container 82, as illustrated in FIGS. 1 to 3, the free edge 84 of the dirt collection container 82 abuts against the lower edge 86 of the inlet chamber 74 in a flow-tight manner, so that by means of the suction unit situated in the suction head 78, not only the inlet chamber 74 but also the dirt collection container 82 may be acted on by negative pressure. Suctioned material may thus be drawn in through the suction inlet 80 and the inlet chamber 74, into the dirt collection container 82.

For emptying the dirt collection container 82, the push bar 32, starting from its substantially horizontally aligned operating position, may be pivoted upwardly about the pivot axis 70. For this purpose, the user in a standing posture may comfortably grip the handle part 46 and pivot it into a position above the device upper part 72, as is apparent in particular from FIG. 5. As the result of pivoting the push bar 32 into its substantially vertically aligned servicing position, the load-bearing parts 48 of the two support columns 22, 23 are moved vertically downwardly via the respective connecting rods 52 and toggle levers 54. The dirt collection container 82 is thus lowered until it rests with its support wheels 88 on the floor surface. The dirt collection container may subsequently be laterally pulled out from the U-shaped frame 16 of the stand 14, as is apparent in particular from FIG. 6. The dirt collection container 82 may then be moved along the floor surface to an emptying site and emptied. The empty dirt collection container may then once again be positioned beneath the inlet chamber 74, the lateral support arms 90, 91 of the dirt collection container 82 assuming a position above the load-bearing parts 48. The push bar 32 may subsequently be gripped at the handle part 46 by the user and pivoted downwardly into its horizontally aligned operating position. The load-bearing parts 48 engage beneath the lateral support arms 90, 91, and are moved vertically upwardly via the respective connecting rods 54 and toggle levers 54 until the free edge 84 of the dirt collection container 82 abuts against the lower edge 86 of the inlet chamber 54 in a flow-tight manner. The normal suctioning operation of the vacuum cleaning appliance 10 may then be resumed.

Figure 12:
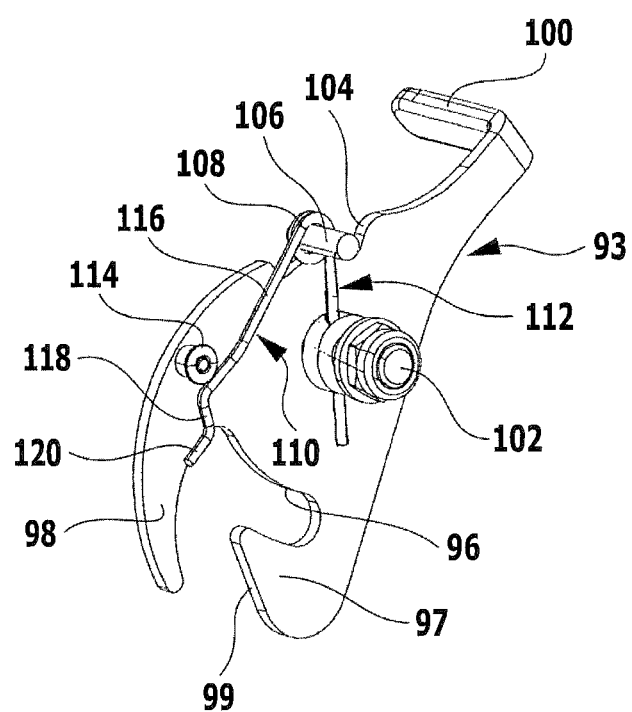
FIG. 12 shows a perspective illustration of a detent hook that is pivotably mounted on the push bar.

When the push bar 32 is pivoted between its operating position and its servicing position, the toggle levers 54 of the two support columns 22, 23 in each case pass through a dead center position in which the two lever arms 56, 58 are in full alignment with one another, whereas in the operating position as well as in the servicing position, the toggle levers in each case are each oriented at an angle relative to one another. This ensures that the push bar 32 does not inadvertently undergo a pivot motion. Additional security against inadvertent pivoting of the push bar 32 is achieved by the use of two identically configured locking devices in the form of a first detent hook 93 and a second detent hook 94. The first detent hook 93 is pivotably mounted on the first leg 30 of the push bar 32, and the second detent hook 94 is pivotably mounted on the second leg 34 of the push bar 32. The two detent hooks 93, 94 are identically configured. As is apparent in particular from FIG. 12, at a front end portion, the detent hooks each have an approximately L-shaped recess 96 which on the one hand is delimited by a hook-shaped end portion 97, and on the other hand by a curved end portion 98. On its end face, the hook-shaped end portion 97 has a flat sliding surface 99. At their rear ends facing away from the L-shaped recess 96, the two detent hooks 93, 94 in each case have an activating portion 100. The activating portions 100 of the two detent hooks 93, 94 are aligned facing one another, substantially perpendicular to the respective leg 30 or 34 of the push bar 32. This is apparent in particular from FIGS. 2 and 4.

The detent hooks 93, 94 are each pivotably mounted on a pivot pin 102 which is fixedly connected to the leg 30 or 34, respectively. Above the pivot pin 102, the detent hooks 93, 94 each have a lateral recess 104 in the region between the curved end portion 98 and the activating portion 100. Situated in the lateral recess 104 is a retaining pin 106 which is fixedly connected to the respective leg 30 or 34, and on which a spring element in the form of a spreading spring 108 is mounted. The spreading spring 108 has a first spring leg 110 and a second spring leg 112. The first spring leg 110 is fixed to the pivot pin 102, and the second spring leg 112 abuts against a peg-shaped drive member 114 of the respective detent hook 93 or 94. The second leg 112, starting from the retaining pin 106, includes an inner leg portion 116, which, via a bend 118 oriented perpendicularly with respect to the leg portion 116 and facing the drive member 114, merges into an outer leg portion 120.

The detent hook 93 or 94 is pivoted about the pivot pin 102 under the action of the spreading spring 108.

To lock the push bar 32 in its substantially horizontally aligned operating position, the detent hooks 93, 94 in each case interact with a detent pin 122 which is fixed to a support column 22, 23, respectively, on the support plate 25, and which in the operating position of the push bar 32 may be enclosed by the hook-shaped end portion 97 of the detent hook 93, 94. This is apparent in particular from FIG. 8. In this position, the outer leg portion 120 of the second spring leg 112 abuts against the drive member 114, so that the spreading spring 108 presses the hook-shaped end portion 97 against the detent pin 122.

The push bar 32 must be pivoted into its substantially vertically aligned servicing position in order to lower the dirt collection container 83. For this purpose, in a first step it is necessary to pivot the two detent hooks 93, 94 into their released position. To this end, the user may grip the detent hooks 93, 94 on their activating portion 100 and pivot them about the respective pivot pin 102 so that instead of the outer leg portion 120, the inner leg portion 116 comes into contact with the drive member 114. As a result, the hook-shaped end portion 97 releases the detent pin 122, which then contacts the inner side of the curved end portion 98. This is apparent in particular from FIG. 9.

The push bar 32 may then be pivoted upwardly about the pivot axis 70 into the servicing position, so that the dirt collection container 82 is lowered onto the floor surface and may be subsequently emptied.

In order to once again raise the emptied dirt collection container 82, the user may pivot the push bar 32, starting from its servicing position, downwardly into its operating position. Shortly before reaching the operating position of the push bar 32, the flat sliding surfaces 99 of the detent hooks 93, 94 meet the stationary detent pin 122, as is apparent from FIG. 10. The detent hooks 93, 94 are thus pivoted about the pivot pin 102, against the spring force of the spreading spring 108, until the hook-shaped end portion 97 is subsequently able to engage around the detent pin 122; i.e., the detent pin 122 is received by the L-shaped recess 96 in the respective detent hook 93 or 94. When the operating position is reached, the push bar 32 is thus reliably locked by means of the detent hooks 93, 94 and the associated detent pins 122.

To release the lock of the push bar 32 in its operating position, the user must thus intentionally manually move both detent hooks 93 and 94 into their released position in which the hook-shaped end portions 97 release the respective detent pin 122. Only then may the push bar 32 be pivoted into its servicing position. The risk of the push bar 32 inadvertently pivoting into its servicing position, thus separating the dirt collection container 82 from the inlet chamber 74, may thus be minimized.

In contrast, locking the push bar 32 during pivoting from the servicing position into the operating position requires no manual manipulation of the detent hooks 93, 94 by the user. Instead, during the transition of the push bar 32 from the servicing position into the operating position, the detent hooks are automatically transferred into their locked position as a result of the flat sliding surface 99 sliding along the detent pin 122.

The push bar 32 has, on the one hand, the function of raising and lowering the dirt collection container 82 via the lifting mechanisms 28 of the two support columns 22, 23. In the illustrated embodiment, the user has to pivot the push bar 32 about the pivot axis 70 by only approximately 90°, and in a standing posture may comfortably grip the push bar 32 in its operating position. Thus, when lowering the dirt collection container 32, the user does not have to change his position at the side of the vacuum cleaning appliance 10. This simplifies the handling of the vacuum cleaning appliance 10. In addition, the push bar 32 has the function of moving the entire vacuum cleaning appliance 10 along a floor surface. Here as well, the user may grip the push bar 32 in the region of the handle part 46 in a comfortable posture, and may exert a pushing or pulling force on the push bar 32.

The invention claimed is:

1. A vacuum cleaning appliance having a stand which is movable along a floor surface, and a suction device having a device upper part which is mounted on the stand, and a dirt collection container situated beneath the device upper part, the stand having at least one lifting device and an actuating element which is pivotable about a horizontal pivot axis for raising and lowering the dirt collection container, which in its raised position abuts against the device upper part in a flow-tight manner, and in its lowered position is situated at a distance from the device upper part and rests on the floor surface, wherein the actuating element is configured as a push bar which is adapted to be gripped by the user in a standing posture in order to move the vacuum cleaning appliance, and is upwardly pivotable about the pivot axis by at most 135° in order to lower the dirt collection container,
wherein the push bar is lockable in the raised position of the dirt collection container,
wherein the vacuum cleaning appliance has at least one locking element which is movable back and forth between a locked position, in which the push bar is locked, and a released position in which the push bar is pivotable, and
wherein when the dirt collection container is raised, the at least one locking element is automatically movable into its locked position by pivoting the push bar.

2. The vacuum cleaning appliance according to claim 1, wherein in the raised position of the dirt collection container, the push bar is inclined by at most 30° with respect to the horizontal.

3. The vacuum cleaning appliance according to claim 1, wherein in the lowered position of the dirt collection container, the push bar is inclined by at most 30° with respect to the vertical.

4. The vacuum cleaning appliance according to claim 1, wherein the dirt collection container is raisable and lowerable by pivoting the push bar by at most 90°.

5. The vacuum cleaning appliance according to claim 1, wherein the stand has two support columns between which the suction device is situated, and on which in each case a load-bearing part that is coupled to the push bar is mounted in a height-adjustable manner.

6. The vacuum cleaning appliance according to claim 5, wherein the load-bearing parts in each case are displaceably mounted in a guide of a support column.

7. The vacuum cleaning appliance according to claim 5, wherein the load-bearing parts are each coupled to the push bar via a toggle lever.

8. The vacuum cleaning appliance according to claim 7, wherein the toggle levers have a first lever arm which is pivotably mounted on the support column and which by means of an articulated joint is connected to a second lever arm that is articulatedly coupled to a load-bearing part via a connecting rod.

9. The vacuum cleaning appliance according to claim 8, wherein the second lever arm is fixedly connected to the push bar.

10. The vacuum cleaning appliance according to claim 8, wherein the push bar is C- or U-shaped and has two end portions that are connected to one another via a connecting portion which forms a handle part, a second lever arm of a toggle lever in each case adjoining the end portions.

11. The vacuum cleaning appliance according to claim 10, wherein each of the second lever arms is oriented obliquely or perpendicularly with respect to an end portion of the push bar.

12. The vacuum cleaning appliance according to claim 9, wherein the second lever arms are joined to the push bar in one piece.

13. The vacuum cleaning appliance according to claim 1, wherein the push bar is adapted to be acted on by a retention force in the lowered position of the dirt collection container.

14. The vacuum cleaning appliance according to claim 1, wherein the at least one locking element interacts with a spring element which selectively holds the locking element in the locked position or in the released position, depending on the orientation of the locking element relative to the spring element.

15. The vacuum cleaning appliance according to claim 1, wherein the at least one locking element is manually movable into its released position in order to lower the dirt collection container.

16. The vacuum cleaning appliance according to claim 1, wherein the at least one locking element is situated on the push bar.

17. The vacuum cleaning appliance according to claim 16, wherein two movable locking elements are situated on the push bar, each interacting with an arresting member which is fixedly secured to the stand.

18. The vacuum cleaning appliance according to claim 1, wherein the at least one locking element is configured as a detent hook which is pivotably mounted on the push bar, and which in the locked position engages behind a detent pin situated on the stand.

19. The vacuum cleaning appliance according to claim 18, wherein when the push bar is pivoted, the detent hook slides along the detent pin into the position corresponding to the raised position of the dirt collection container, and goes into its locked position.

20. A vacuum cleaning appliance having a stand which is movable along a floor surface, and a suction device having a device upper part which is mounted on the stand, and a dirt collection container situated beneath the device upper part, the stand having at least one lifting device and an actuating element which is pivotable about a horizontal pivot axis for raising and lowering the dirt collection container, which in its raised position abuts against the device upper part in a flow-tight manner, and in its lowered position is situated at a distance from the device upper part and rests on the floor surface, wherein the actuating element is configured as a push bar which is adapted to be gripped by the user in a standing posture in order to move the vacuum cleaning appliance, and is upwardly pivotable about the pivot axis by at most 135° in order to lower the dirt collection container,
   wherein the stand has two support columns between which the suction device is situated, and on which in each case a load-bearing part that is coupled to the push bar is mounted in a height-adjustable manner,
   wherein the load-bearing parts in each case are displaceably mounted in a guide of a support column,
   wherein the load-bearing parts are each coupled to the push bar via a toggle lever, and
   wherein the toggle levers have a first lever arm which is pivotably mounted on the support column and which by means of an articulated joint is connected to a second lever arm that is articulatedly coupled to a load-bearing part via a connecting rod.

21. A vacuum cleaning appliance having a stand which is movable along a floor surface, and a suction device having a device upper part which is mounted on the stand, and a dirt collection container situated beneath the device upper part, the stand having at least one lifting device and an actuating element which is pivotable about a horizontal pivot axis for raising and lowering the dirt collection container, which in its raised position abuts against the device upper part in a flow-tight manner, and in its lowered position is situated at a distance from the device upper part and rests on the floor surface, wherein the actuating element is configured as a push bar which is adapted to be gripped by the user in a standing posture in order to move the vacuum cleaning appliance, and is upwardly pivotable about the pivot axis by at most 135° in order to lower the dirt collection container,
   wherein the push bar is adapted to be acted on by a retention force in the lowered position of the dirt collection container.

22. A vacuum cleaning appliance having a stand which is movable along a floor surface, and a suction device having a device upper part which is mounted on the stand, and a dirt collection container situated beneath the device upper part, the stand having at least one lifting device and an actuating element which is pivotable about a horizontal pivot axis for raising and lowering the dirt collection container, which in its raised position abuts against the device upper part in a flow-tight manner, and in its lowered position is situated at a distance from the device upper part and rests on the floor surface, wherein the actuating element is configured as a push bar which is adapted to be gripped by the user in a standing posture in order to move the vacuum cleaning appliance, and is upwardly pivotable about the pivot axis by at most 135° in order to lower the dirt collection container,
   wherein the push bar is lockable in the raised position of the dirt collection container,
   wherein the vacuum cleaning appliance has at least one locking element which is movable back and forth between a locked position, in which the push bar is locked, and a released position in which the push bar is pivotable,
   wherein the at least one locking element is situated on the push bar, and wherein two movable locking elements are situated on the push bar, each interacting with an arresting member which is fixedly secured to the stand.

23. A vacuum cleaning appliance having a stand which is movable along a floor surface, and a suction device having a device upper part which is mounted on the stand, and a dirt collection container situated beneath the device upper part, the stand having at least one lifting device and an actuating element which is pivotable about a horizontal pivot axis for raising and lowering the dirt collection container, which in its raised position abuts against the device upper part in a flow-tight manner, and in its lowered position is situated at a distance from the device upper part and rests on the floor surface, wherein the actuating element is configured as a push bar which is adapted to be gripped by the user in a standing posture in order to move the vacuum cleaning appliance, and is upwardly pivotable about the pivot axis by at most 135° in order to lower the dirt collection container,
- wherein the push bar is lockable in the raised position of the dirt collection container,
- wherein the vacuum cleaning appliance has at least one locking element which is movable back and forth between a locked position, in which the push bar is locked, and a released position in which the push bar is pivotable, and
- wherein the at least one locking element is configured as a detent hook which is pivotably mounted on the push bar, and which in the locked position engages behind a detent pin situated on the stand.

\* \* \* \* \*

UNITED STATES PATENT AND TRADEMARK OFFICE
CERTIFICATE OF CORRECTION

| | |
|---|---|
| PATENT NO. | : 8,826,491 B2 |
| APPLICATION NO. | : 13/745473 |
| DATED | : September 9, 2014 |
| INVENTOR(S) | : Gábor Peflof, Roland Jeutter and Wolfgang Richter |

Page 1 of 1

It is certified that error appears in the above-identified patent and that said Letters Patent is hereby corrected as shown below:

On Title Page, item (71), the Applicant name appears as Alfred Karcher GmbH & Co. KG and it should appear as it does under the "Assignee" heading (73), with an umlaut over the letter "a" as follows. Alfred Kärcher GmbH & Co. KG.

Signed and Sealed this
Twenty-fourth Day of February, 2015

Michelle K. Lee
*Deputy Director of the United States Patent and Trademark Office*